US009734964B2

(12) United States Patent
Schmoeger

(10) Patent No.: US 9,734,964 B2
(45) Date of Patent: Aug. 15, 2017

(54) RUBBER MAT KEYBOARD, PARTICULARLY A SILICONE MAT KEYBOARD

(71) Applicant: PrehKeyTec GmbH, Mellrichstadt (DE)

(72) Inventor: Klaus Schmoeger, Bad Neustadt (DE)

(73) Assignee: PrehKeyTec GmbH, Mellrichstadt (DE)

( * ) Notice: Subject to any disclaimer, the term of this patent is extended or adjusted under 35 U.S.C. 154(b) by 0 days.

(21) Appl. No.: 14/733,319

(22) Filed: Jun. 8, 2015

(65) Prior Publication Data

US 2015/0270078 A1 Sep. 24, 2015

Related U.S. Application Data

(63) Continuation of application No. PCT/EP2013/074749, filed on Nov. 26, 2013.

(30) Foreign Application Priority Data

Dec. 7, 2012 (DE) .................. 20 2012 104 778 U

(51) Int. Cl.
| | |
|---|---|
| B41J 5/00 | (2006.01) |
| H01H 13/82 | (2006.01) |
| G06F 3/02 | (2006.01) |
| H01H 13/86 | (2006.01) |

(52) U.S. Cl.
CPC ........... H01H 13/82 (2013.01); G06F 3/0202 (2013.01); G06F 3/0219 (2013.01); H01H 13/86 (2013.01); *H01H 2209/026* (2013.01); *H01H 2213/01* (2013.01); *H01H 2223/002* (2013.01); *H01H 2229/032* (2013.01); *H01H 2231/006* (2013.01); *H01H 2239/008* (2013.01); *H01H 2239/034* (2013.01); *H01H 2239/038* (2013.01)

(58) Field of Classification Search
CPC ....................................... H01H 13/82
USPC ......................................... 400/472
See application file for complete search history.

(56) References Cited

U.S. PATENT DOCUMENTS

| | | | | |
|---|---|---|---|---|
| RE32,419 E | * | 5/1987 | Rooney ................. | H01H 11/00 200/5 R |
| 4,735,520 A | * | 4/1988 | Suzuki ...................... | B41J 5/10 341/22 |

(Continued)

FOREIGN PATENT DOCUMENTS

| | | |
|---|---|---|
| DE | 20 2007 003 350 U1 | 7/2007 |
| DE | 20 2007 017 430 U1 | 4/2008 |

(Continued)

*Primary Examiner* — Anthony Nguyen
(74) *Attorney, Agent, or Firm* — Muncy, Geissler, Olds & Lowe, P.C.

(57) ABSTRACT

A data input and/or operator control system, particularly a keypad, also a POS keypad, having a lower portion and an upper portion and also at least one printed circuit board and at least one retaining plate. Inside, one or more protective mat(s) made of an elastic material is/are preferably adhesively bonded to the printed circuit board. In this protective mat, the components of the printed circuit board are recessed to as small an extent as possible and air ducts are incorporated in order to ensure that the keys are ventilated in relation to one another.

16 Claims, 1 Drawing Sheet

(56) References Cited

U.S. PATENT DOCUMENTS

| | | | | |
|---|---|---|---|---|
| 6,965,076 | B2* | 11/2005 | Wu | G06F 3/0202 174/541 |
| 7,014,377 | B2* | 3/2006 | Yamauchi | H01H 13/702 200/314 |
| 7,723,631 | B2 | 5/2010 | Purcocks | |
| 8,779,313 | B2 | 7/2014 | Su | |
| 9,111,703 | B2* | 8/2015 | Whitt, III | H01H 13/704 |
| 2005/0000789 | A1 | 1/2005 | Yoneyama | |
| 2006/0225995 | A1 | 10/2006 | Ohnishi | |
| 2009/0033627 | A1* | 2/2009 | Aasen | G06F 3/0221 345/168 |
| 2009/0236206 | A1 | 9/2009 | Wennemer et al. | |
| 2009/0308722 | A1 | 12/2009 | Hsu et al. | |
| 2010/0059347 | A1 | 3/2010 | Tang et al. | |
| 2010/0111585 | A1* | 5/2010 | Tsai | G06F 3/0202 400/472 |
| 2010/0187079 | A1* | 7/2010 | Dumont | H01H 13/83 200/341 |
| 2011/0005908 | A1 | 1/2011 | Lin et al. | |
| 2012/0160655 | A1* | 6/2012 | Takai | H01H 13/82 200/513 |
| 2012/0306783 | A1* | 12/2012 | Lamb | G06F 3/0414 345/173 |
| 2013/0215035 | A1* | 8/2013 | Guard | G06F 3/0221 345/168 |

FOREIGN PATENT DOCUMENTS

| | | |
|---|---|---|
| DE | 60 2004 011 111 T2 | 12/2008 |
| DE | 20 2009 013 481 U1 | 12/2010 |
| DE | 20 2010 008 809 U1 | 3/2011 |
| DE | 10 2009 051 829 A1 | 5/2011 |
| EP | 1 696 449 A2 | 8/2006 |
| EP | 2 221 843 A1 | 8/2010 |
| GB | 2469358 A | 10/2010 |
| KR | 10-2011-0035051 A | 4/2011 |

* cited by examiner

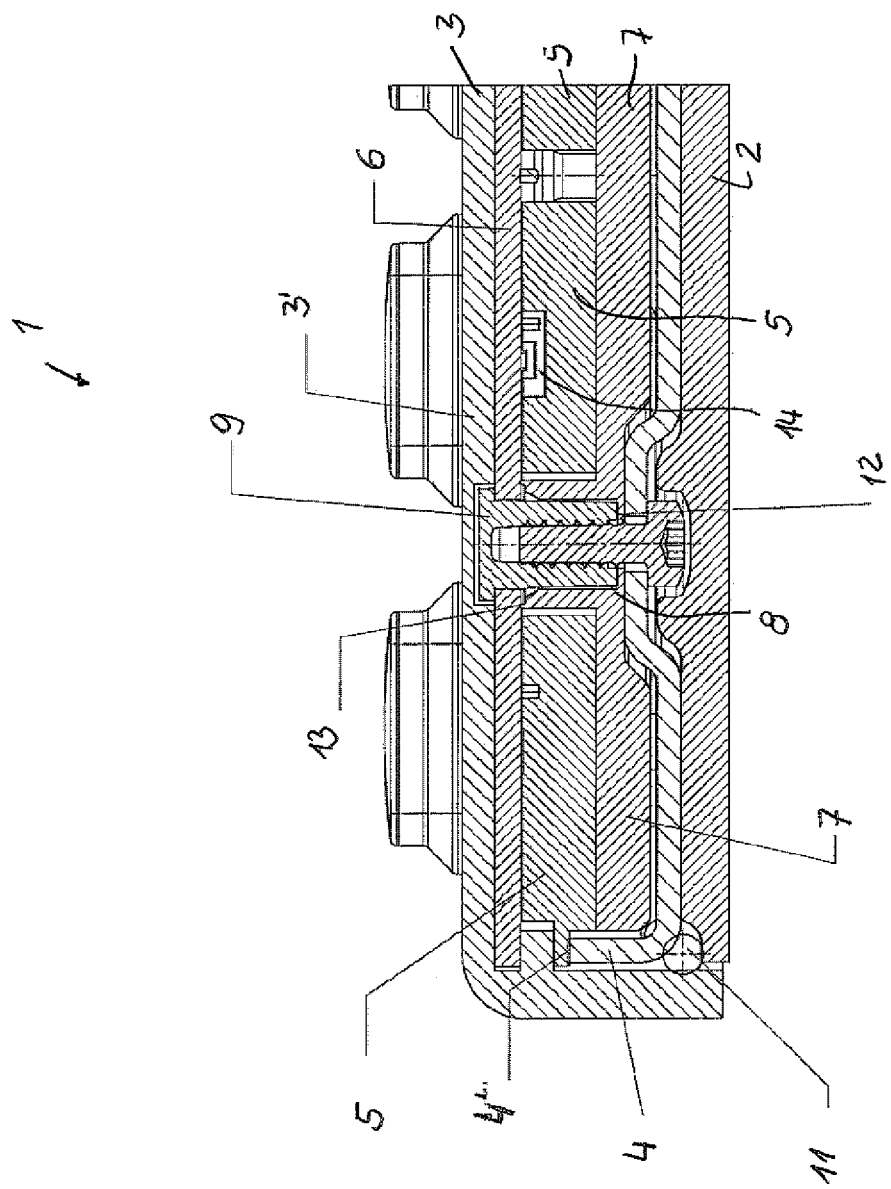

RUBBER MAT KEYBOARD, PARTICULARLY A SILICONE MAT KEYBOARD

This nonprovisional application is a continuation of International Application No. PCT/EP2013/074749, which was filed on Nov. 26, 2013, and which claims priority to German Patent Application No. 20 2012 104 778.0, which was filed in Germany on Dec. 7, 2012 and which are both herein incorporated by reference.

BACKGROUND OF THE INVENTION

Field of the Invention

The invention relates to a data entry and/or operating system, particularly a keyboard, as well as a POS keyboard, for use under harsh environmental conditions, i.e., a keyboard with higher levels of protection or a keyboard that satisfies the higher levels of protection, particularly higher temperature requirements, in addition to vibration, shock, ESD, etc.

Description of the Background Art

Keyboards that are dustproof and waterproof are already available. Thus, DE 20 2007 003 350 U1 describes a dustproof and waterproof keyboard with an outer covering that is completely sealed and for its part possesses antimicrobial properties. DE 20 2010 008 809 U1 discloses a waterproof keyboard with an LED backlight. In this case, a keyboard plate, forming a plurality of keys, is made as a single piece and is airtight and waterproof. To equalize the air pressure, the base plate of the keyboard has at least one air hole for equalizing the air pressure. DE 60 2004 011 111 T2 (EP 1 697 952 B1), which corresponds to U.S. Pat. No. 7,723,631, published a further waterproof keyboard.

Such airtight keyboards very often have the disadvantage that at temperatures below the freezing point they tend to form condensation water in the interior because of the enclosed air moisture. Further, such keyboards tend to swell at temperatures >50° C.

SUMMARY OF THE INVENTION

It is therefore an object of the invention to provide a keyboard that satisfies higher levels of protection such as vibration, shock, ESD, etc. The object is achieved by a rubber mat keyboard, which satisfies the temperature requirements.

In an embodiment, the invention is based on the idea to adhesively bond a protective mat made of an elastic material in the interior to one, if present to a plurality of, printed circuit board(s). The components (printed circuit board) are recessed as little as possible in this protective mat with consideration of tolerances. Furthermore, air channels are created to assure a venting of the keys relative to one another. Furthermore, an intermediate mat, likewise made of silicone, which seals all spaces between the protective mat and the retainer plate as much as possible, is placed on said protective mat. Silicone is preferably selected as the material, because it entails barely any tool costs and the cost of parts can be kept low as a result. Furthermore, because of their elasticity, they can assure a small reduction of pressure in the interior due to changes in volume.

The damping and vibration requirements are fulfilled by the use of one or more bushing/s, preferably made of plastic, which is/are pressed into at least one printed circuit board. The plastic is selected to create an insulation for the screw relative to the printed circuit board and likewise to assure achieving a certain elasticity of the screw connection. A retainer plate used for reinforcement is screwed together with the bushing. Bent or curved edges/curvatures of the retainer plate are braced via the screw connection with circumferential protective mats, preferably silicone mats, and thus used as a damping member for vibrations. The conductive metal plate is insulated without gaps from the printed circuit board(s) by this measure.

The elastic (protective) mat, which is braced by the screw connection and on which a cylindrical cover is situated in the direction of the printed circuit board, is integrated between the plastic bushings and the retainer plate. As a result, here as well vibrations and impacts are dampened and an insulation or reduction of the air gaps to the printed circuit board with respect to ESD is realized.

The stability of the keyboard itself is realized via a skeletal frame having the printed circuit board(s), bushing(s), and the retainer plate. Said framework is held in place via the silicon mat with keys, the protective mat(s), and the intermediate mat(s).

As a consequence of the invention, therefore, the requirements of a cost-effective and installation-friendly invention are merged and optimally implemented. The required rigidity of the entire system is assured, whereas the fastening elements have a certain elasticity.

The use of silicone mats in keyboards is known. Thus, DE 20 2011 101 812 U1 describes a keyboard for a data input device, with a keypad comprising a plurality of long travel keys arranged laterally above and below one another. The surface includes a completely sealed silicone mat with dome-shaped keys formed at a defined position. A circumferential edge for receiving a pressure plate with a plunger is arranged on the inner side of the dome-shaped keys. DE 20 2009 013 481 U1 describes a keyboard for a data processing device. A plurality of keys are designed as a one-piece and cover-like flexible molded elastomeric part, particularly as a molded silicone part. The aforementioned keyboards are not suitable, however, for use in a harsh environment. DE 20 2010 004 741 U1 for its part describes a keyboard for use in hygiene-intensive areas with a base body with an electronic subassembly, comprising circuit elements, and a cover formed as key frame. The key frame is locked releasably by means of a quick locking system in a recess of the base body. The electronic subassembly is sealed by a covering silicone layer. Although said keyboard is adapted to various environmental conditions, it is not suitable for excluding vibration, shock, ESD, etc., during further use.

A so-called (rubber) flat input keyboard for data processing devices and a method for the production thereof are described in DE 44 98 145 C1. Said keyboard can be rolled up and unrolled but is not suitable for use under harsh environmental conditions.

DE 196 08 773 C2 discloses a switch mat, which is notable in that the switch chamber located below the key caps are connected to the atmosphere via ventilating channels. An air-permeable filter layer, made as a dust- and moisture-repellent filter matting, is integrated into the ventilating channels.

BRIEF DESCRIPTION OF THE DRAWING

The present invention will become more fully understood from the detailed description given hereinbelow and the accompanying drawing which is given by way of illustration only, and thus, are not limitive of the present invention, and wherein the sole FIGURE illustrates a keyboard according to an exemplary embodiment.

DETAILED DESCRIPTION

The single FIGURE shows a data input and/or operating system, particularly a keyboard, here an intrinsically stable rubber keyboard, which is illustrated in section and labeled with 1. The data input and/or operating system 1, called only keyboard 1 below, includes a lower part 2 and an upper part 3. Lower part 2, which serves as the bottom of the keyboard, can be made preferably of a rubber material such as silicone. Upper part 3 is formed by a rubber mat 3' with key(s). Silicone is preferably used as the rubber. For a desired imperviousness, upper and lower parts 3, 2 are connected sealingly to one another by means of an adhesive introduced circumferentially, e.g., a silicone adhesive. Other types of sealing connections such as clamps, etc., are also possible.

At least one retainer plate 4, preferably made as a single piece, at least one or more protective mats 5 above one another or next to one another, and at least one printed circuit board 6 are placed between lower part 2 and upper part 3. Retainer plate 4, for example, a metal sheet, is used preferentially for reinforcing keyboard 1. Retainer plate(s) 4 preferably has/have circumferential or bent edges 4'.

Individual intermediate mats 7, alternatively also designed as a one-piece mat with feed-throughs 8, if this seems necessary, can be integrated, moreover, into keyboard 1. They can be mounted between retainer plate 4 and the one or more protective mats 5. Intermediate mat(s) 7 and protective mat(s) 5 preferably is formed of silicone. They are used, inter alia, for damping/ESD, whereby for this purpose intermediate mat 7 dampens in area 13 in relation to printed circuit board 6 and in area 12 in which retainer plate 4 is pressed into intermediate mat 7 against bushing 9. Intermediate mat(s) 7 can be formed so that protective mat 5 comes to lie in them, at least partially laterally sealingly therewith. All spaces between protective mat 5 and retainer plate 4 are sealed (as much as possible) by this intermediate mat 7 in which protective mat 5 is inserted.

One or more plastic bushings 9 take over the connection of the individual parts of retainer plate(s) 4, intermediate mats 7, protective mat 5, and printed circuit board 6. By means of this connection, retainer plate 4 is pressed into intermediate mat(s) 7 and retainer plate(s) 4 into protective mat(s) 5. Protective mat(s) 5 for its/their part can be pulled onto/over edges 4' of retainer plate(s) 4. Intermediate mat(s) 7 has/have at least one rib 7', which projecting upwardly at plastic bushing(s) 9 lies against it/them circumferentially. The insulation or the extent of the insulation to printed circuit board 6 is increased by this upright rib 7'.

Air channels 14 are provided for ventilating the keys relative to one another.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A data input and/or operating system, comprising
a lower part made of silicone;
an upper part made of silicone;
at least one printed circuit board; and
at least one retainer plate,
wherein one or more protective mats of an elastic material are adhesively bonded in the interior to the printed circuit board,
wherein components of the printed circuit board are recessed in the protective mat and air channels are integrated to assure ventilation of keys relative to one another, and
wherein the retainer plate lies on the lower part, wherein one or more bushings are integrated for connecting the printed circuit board with the retainer plate, where the upper part is formed by a silicone mat with keys, wherein the stability of the keyboard is realized by the printed circuit board, the bushings, and the retainer plate, and wherein the lower part is connected sealingly to the upper part.

2. The data input and/or operating system according to claim 1, wherein an intermediate mat, made of silicone, which seals all spaces between the protective mat and the retainer plate, is placed on the protective mats.

3. The data input and/or operating system according to claim 1, wherein the retainer plate is made of a metal sheet.

4. The data input and/or operating system according to claim 1, wherein the retainer plate has circumferential or bent edges.

5. A data input and/or operating system, comprising
a lower part made of silicone;
an upper part made of silicone;
at least one printed circuit board; and
at least one retainer plate,
wherein one or more protective mats of an elastic material are adhesively bonded in the interior to the printed circuit board,
wherein components of the printed circuit board are recessed in the protective mat and air channels are integrated to assure ventilation of keys relative to one another,
wherein an intermediate mat, made of silicone, which seals all spaces between the protective mat and the retainer plate, is placed on the protective mats, and
wherein the intermediate mat has at least one rib, which lies circumferentially against the bushing.

6. The data input and/or operating system according to claim 2, wherein the intermediate mat seals substantially all spaces between the protective mats and the retainer plate.

7. The data input and/or operating system according to claim 1, wherein the bushings are formed of plastic.

8. The data input and/or operating system according to claim 1, wherein the data input and/or operating system is a keyboard.

9. The data input and/or operating system according to claim 1, wherein the data input and/or operating system is a POS keyboard.

10. The data input and/or operating system according to claim 1, wherein the lower part and the upper part are adhered together such that the data input and/or operating system is impervious.

11. The data input and/or operating system according to claim 2, wherein in a cross-sectional view of the data input and/or operating system, the retainer plate is provided between the lower part and the intermediate mat, the intermediate mat is provided between the retainer plate and the protective mats, the protective mats are provided between the intermediate mat and the printed circuit board and the printed circuit board is provided between the protective mats and the upper part, and
wherein the upper part is provided with keys.

12. The data input and/or operating system according to claim 1, wherein the bushings each extend through aligned openings in the printed circuit board and the intermediate mat.

13. The data input and/or operating system according to claim 12, wherein an upper end of each of the bushings is recessed in a lower surface of the upper part.

14. The data input and/or operating system according to claim 12, wherein a screw is inserted inside each of the bushings, each screw extending through an opening in the retainer plate, such that the printed circuit board is connected with the retainer plate.

15. The data input and/or operating system according to claim 14, wherein a head of each screw is recessed in an upper surface of the lower part.

16. A data input and/or operating system, comprising
a lower part made of silicone;
an upper part made of silicone;
at least one printed circuit board; and
at least one retainer plate,
wherein one or more protective mats of an elastic material are adhesively bonded in the interior to the printed circuit board,
wherein components of the printed circuit board are recessed in the protective mat and air channels are integrated to assure ventilation of keys relative to one another, and
wherein the retainer plate has bent edges that extend upwards toward the upper part.

* * * * *